United States Patent [19]

Wagner et al.

[11] 4,102,075
[45] Jul. 25, 1978

[54] AQUATIC SOUND GENERATING SYSTEM FOR FISHING LURES

[76] Inventors: Anthony S. Wagner, 104 Red Horse G.R.; Kenneth R. Kay, 1239 North Blvd., both of, Universal City, Tex. 78148

[21] Appl. No.: 633,717

[22] Filed: Nov. 20, 1975
(Under 37 CFR 1.47)

Related U.S. Application Data

[63] Continuation-in-part of Ser. No. 541,699, Jan. 16, 1975, abandoned.

[51] Int. Cl.² ............................................. A01K 85/01
[52] U.S. Cl. .................................... 43/17.1; 43/42.06; 43/42.31
[58] Field of Search .................... 43/42.06, 17.1, 42.31

[56] References Cited

U.S. PATENT DOCUMENTS

| 923,670 | 6/1909 | Lockhart | 43/42.06 |
|---|---|---|---|
| 1,099,606 | 6/1914 | Larrabee | 43/42.06 |
| 1,609,855 | 12/1926 | Bayer | 43/42.06 |
| 2,229,369 | 1/1941 | Buettner | 43/42.06 |
| 2,549,077 | 4/1951 | Garth | 43/42.31 |
| 3,040,465 | 6/1962 | Gierat | 43/42.31 |
| 3,744,174 | 7/1973 | Lund | 43/42.06 |

OTHER PUBLICATIONS

R. W. Warren, "Some Parameters Affecting the Design of Bistable Fluid Amplifiers", Nov. 28, 1962.

Primary Examiner—Ronald E. Suter

[57] ABSTRACT

The present invention is for fishing lures having a variable pressure diffuser system for generating a particular frequency simulating aquatic sounds. As a fishing lure is pulled through the water, water flows through an entrance venturi into a fluidic diffuser chamber. Also connected to the fluidic diffuser chamber, perpendicular to the normal direction of flow of the fluid, are two control channels. From the fluidic diffuser chamber, the flow of the fluid is exhausted through channels angling off at a predetermined angle from the center line of the normal flow of the fluid through the venturi. The predetermined angle, along with size of the fluidic diffuser chamber determines the frequency at which the diffuser system will self resonate. Fish hooks are attached to the lure having the self resonating system for catching the fish.

9 Claims, 6 Drawing Figures

AQUATIC SOUND GENERATING SYSTEM FOR FISHING LURES

The present application is a continuation-in-part of U.S. Pat. application Ser. No. 541,699 filed on Jan. 16, 1975 by one of the co-inventors herein, said application Ser. No. 541,699 being expressly abandoned upon filing of the present application.

BACKGROUND OF THE INVENTION

The present invention relates to fishing lures and, more particularly, to fishing lures having self resonating variable pressure diffuser systems located therein for generating aquatic sounds.

BRIEF DESCRIPTION OF THE PRIOR ART

Many different types of fishing lures have been devised in the past wherein sounds are generated by the fishing lure as the lure is drawn through the water. The sounds are supposed to imitate the sounds of typical aquatic life on which a fish would normally feed. Attempts to produce such a sound generating fishing lure has resulted in the use of numerous types of turbulence producing devices including, for example, spinning pedals or similar mechanisms. As the fish lure is drawn through the water, the force of the water would turn a paddle wheel to generate sound.

Other types of fishing lures would use flapper devices that flap back and forth as they were drawn through the water, hopefully to produce a sound simulating that generated by the normal foods on which a fish would feed. These flapper devices come in just about all shapes, sizes and configurations as can be imagined by the numerous fishermen across the country.

Other types of systems have used a combination of spinning devices with the mechanical flappers with some also including venturi paths for allowing fluid flow therethrough. However, none of the prior systems had a self resonating type of device as is possible with the variable pressure diffuser system.

SUMMARY OF THE INVENTION

It is an object of the present invention to provide a fishing lure having a self resonating chamber therein to produce aquatic sounds.

It is yet another object of the present invention to provide a fishing lure having fluid flow channels therethrough with the fluid self resonating to produce typical aquatic sounds.

It is even a further object of the present invention to provide a fishing lure having hooks attached thereto with the lure enclosing a variable pressure diffuser system that self resonates to produce aquatic sounds as the lure is pulled through the water.

It is still another object of the present invention to provide a fishing lure having hooks attached thereto wherein a funnel directs fluid through a venturi into a fluidic diffuser chamber with control channels connecting to the chamber perpendicular to the normal direction of flow of the fluid. Exhaust from the fluidic diffuser chamber are angled from a center line of normal flow at a predetermined angle. The fluid flowing through the fluidic diffuser chamber resonates at a predetermined design frequency to produce typical aquatic sounds.

BRIEF DESCRIPTION OF THE PREFERRED EMBODIMENT

Figure 1:
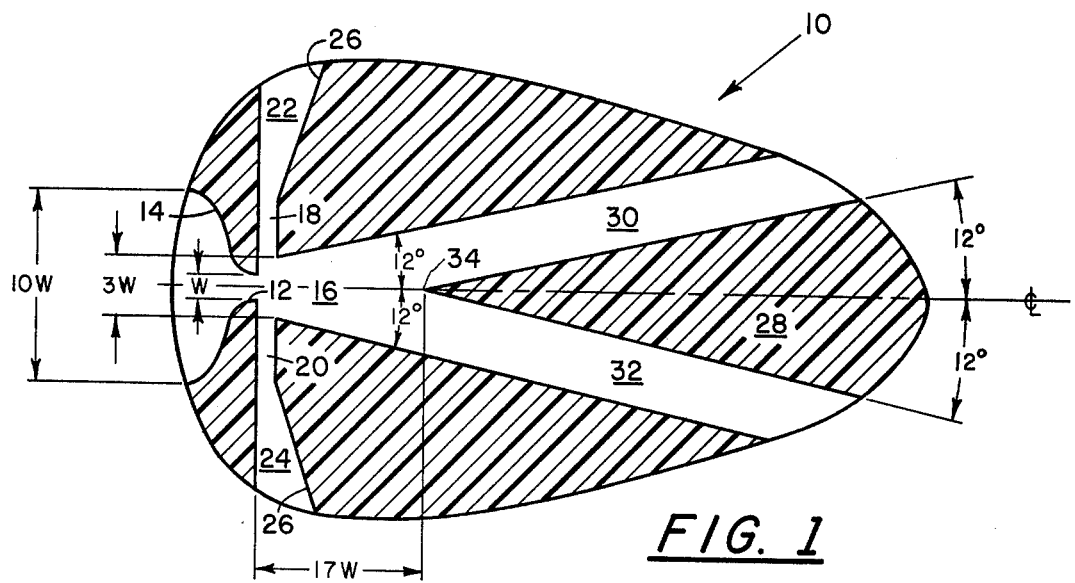
FIG. 1 is a variable pressure diffuser system that will self resonate to produce aquatic sounds when pulled to the left through water.

Referring now to FIG. 1 there is shown a variable pressure diffuser system, represented generally by the reference numeral 10. By moving the diffuser system 10 to the left through a fluid such as water, the water will be directed through venturi 12 by means of funnel 14. The funnel 14 may be concave, convex or a straight funnel with the only requirement being that the funnel 14 direct as much water as possible through venturi 12 with the minimum amount of resistance. The base measurement for the variable pressure diffuser system is represented by the letter W and corresponds to the cross sectional diameter of venturi 12. From venturi 12, the water is discharged into a fluidic diffuser chamber 16 which has an initial cross sectional diameter of 3W.

Adjacent to and perpendicular to the normal flow of water through venturi 12 are located control channels 18 and 20. The outer ends 22 and 24 of control channels 18 and 20, respectively, have been enlarged by angling the inner walls 26 to the right away from the perpendicular axis. As the diffuser system 10 is moved to the left through the water, a vacuum will be created in control channels 18 and 20 thereby drawing some of the fluid that flows through the venturi 12 into chamber 16. By enlarging the control channels 18 and 20 on the outer ends 22 and 24, respectively, an additional vacuum can be drawn; however, the variable pressure diffuser system will work with straight control channels 18 and 20.

The fluidic diffuser chamber 16, which is three times as wide as venturi 12 at its narrowest point, is enlarged by an angle of approximately twelve degrees with respect to the center line of the variable pressure diffuser system. Also along the center line of the variable pressure diffuser system, a distance of approximately 17W from the venturi 12, is located a wedge shaped portion 28 that divides the flow between exhaust channels 30 and 32. The wedge shaped portion 28 is also at an angle of approximately 12° to the center line so that both sides of the exhaust channels 30 and 32 are parallel with the exhaust channels 30 and 32 having a uniform cross sectional area from point 34 of the wedge shaped portion 28.

The distances and angles, while being approximated in the present patent application, have been determined through considerable prior experimental use. In a typical fishing lure, W will be approximately five millimeters with the additional measurements being proportioned to W. Even the inner walls 26 of control channels 18 and 20 are angled at approximately 18.5°, which corresponds to 2W along the line perpendicular to the center line for every 1W parallel to the center line.

If water flows through the variable pressure diffuser system 10 by moving the diffuser system 10 to the left (as would be done in the reeling of a lure through the water), the water inside of the fluidic diffuser chamber 16 will create pulsating compression waves in the water and/or laminar flow turbulences. These aquatic disturbances are perceived by fish as aquatic sound. These sounds closely imitate the sounds a predator fish is accustomed to hearing from his living food sources.

The purpose of the present invention is to incorporate within the bodies of fishing lures a sound generating system that is non-mechanical, which will create a turbulence and/or compression waves simulating aquatic sound. It is the aquatic compression waves and turbulences that generates the sounds that fish hear. These sounds are used by fish to locate and subsequently feed upon its food sources.

The previously described variable pressure diffuser system 10 as shown in FIG. 1 is tuned to emit the aquatic sounds within the known frequency range of the common food sources of game fish. Normally this is within 10 to 3 cycles per second for a fish such as black bass. The variable pressure diffuser system as shown in FIG. 1 is tuned to the sounds at the mid range of these frequencies, normally twenty cycles per second.

The physical design of the variable pressure diffuser system 10 resonates the water as it flows therethrough causing the main flow of the fluid to alternately switch from exhaust channel 30 to exhaust channel 32 thus creating the pulsating aquatic sound. This pulsating aquatic sound is normally created by the living food a fish normally feeds upon as the food sources rhythmically beat caudal fins when fleeing predator fish. Crawfish, for example, when excited will create a pulsating sound as they beat their tail when trying to escape. These pulsating sounds trigger predator fish into striking the fleeing crawfish. In a properly designed lure containing a variable pressure diffuser system such as shown in FIG. 1, pulsates so as to closely imitate the sounds of live bait fish.

Figure 2:
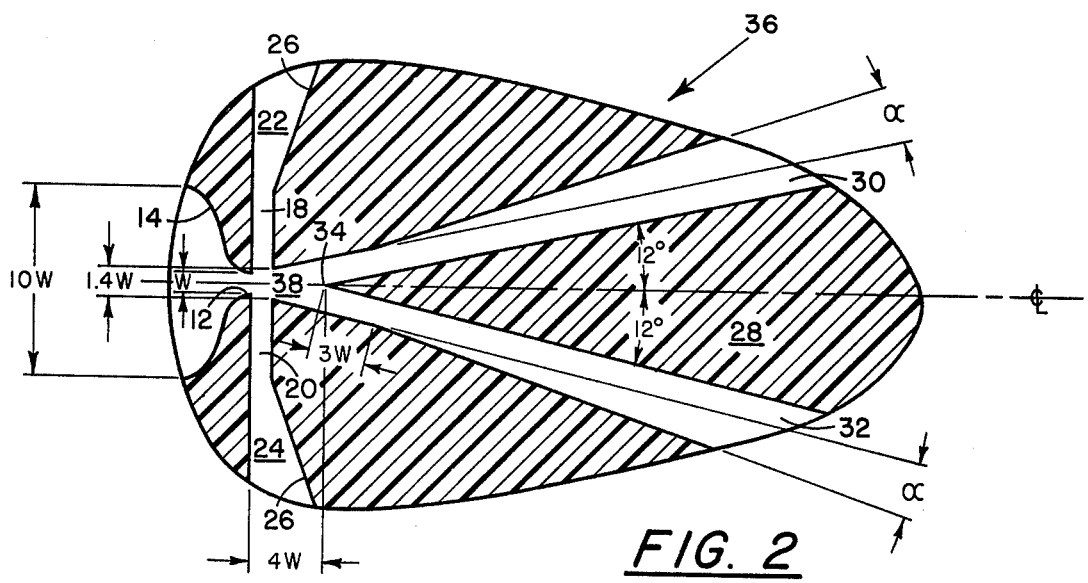
FIG. 2 is a variable pressure diffuser system with diffusers in the exhaust channel to self resonate and produce aquatic sounds when pulled to the left through water.

Referring now to FIG. 2 of the drawings there is shown a variable pressure diffuser system represented generally by reference numeral 36 having a diffuser angle $\alpha$ in the exhaust channels. The number designations that have been used in prior FIG. 1 will also be used in FIG. 2 where appropriate to describe common components. The differences between the variable pressure diffuser system 10 shown in FIG. 1 from the variable pressure diffuser system 36 shown in FIG. 2 will be described in detail. The fluidic diffuser chamber 38 of FIG. 2 is considerably different from the previously described fluidic diffuser chamber 16. While the control channels 18 and 20 are substantially the same, the size of the fluidic diffuser chamber 38 has been reduced from the size shown in FIG. 1. For example, the initial opening of the fluidic diffuser chamber 38 is 1.4W with the depth being approximately 4W. Again the angle of the walls of the exhaust channels 30 and 32 are initially at 12° from the center line of the variable pressure diffuser system 36. However, at a distance of approximately 3W from point 34 of wedge shaped portion 28, the exhaust channels 30 and 32 flare outward at an angle $\alpha$. $\alpha$ normally is in a range of between one to six degrees and may be adjusted accordingly to tune the frequency of the variable pressure diffuser system. This is particularly useful when a particular type of live food bait normally eaten by a game fish creates an aquatic sound in a given frequency range. If the variable pressure diffuser system is set for 20 cycles per second and this type of live food creates a frequency of approximately 10 cycles per second, it may be necessary to vary the pulsating frequency within the variable pressure diffuser system 36.

Figure 3:
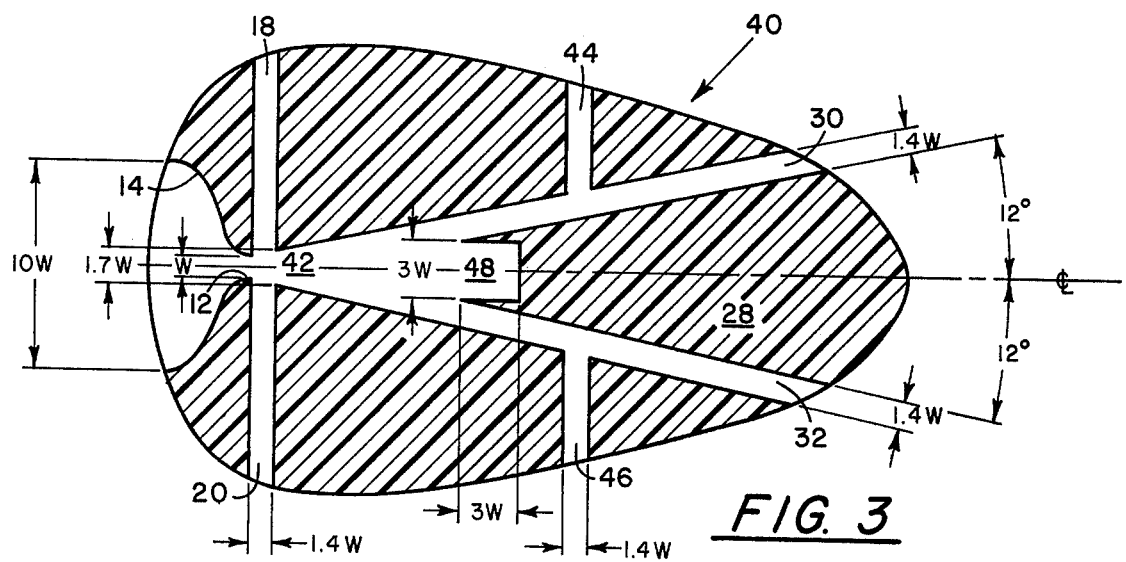
FIG. 3 is a variable pressure diffuser system having a valve box as part of the fluidic diffuser chamber with stabilization vents connecting to the exhaust channels to self resonate and produce aquatic sounds when pulled to the left through water.

Referring now to FIG. 3, there is shown a second alternative embodiment of a variable pressure diffuser system referred to generally by reference numeral 40. Again like numerals will be used to designate like parts between FIG. 3 and FIG. 1. In FIG. 3 the fluid again enters through funnel 14 and venturi 12 into fluidic diffuser chamber 42. The control channels 18 and 20 do not have the 18.5° flare as represented by inner walls 26 of FIG. 1. The fluidic diffuser chamber 42 has an initial opening of 1.7W. The control channels 18 and 20 as well as exhaust channels 30 and 32, plus stabilization vents 44 and 46, have a cross sectional distance of approximately 1.4W. At the right hand side of fluidic diffuser chamber 42 is located a valve box 48 which further aids in creating the pulsating frequencies. The valve box 48 is approximately 3W by 3W with the water flowing into the valve box 48 from venturi 12. A turbulence is created in the valve box 48 which, in combination with control channels 18 and 20, causes the fluid from venturi 12 to flow alternately through exhaust channel 30 and exhaust channel 32 to create a pulsating aquatic sound. The vacuum that is created at the end of the control channels 18 and 20 by the moving of variable pressure diffuser system 40 to the left through water controls the pulsating frequency in combination with the specific size and dimensions of fluidic diffuser chamber 42. The initial width of the fluidic diffuser chamber 42 is 1.7W. The angle from the center line is approximately 12°. Also the leading edges of wedge shaped portion 28 is at an angle of approximately 12° from the center line. The stabilization vents 44 and 46 must be located to the right of fluidic diffuser chamber 42 and valve box 48. The stabilization vents 44 and 46 help keep the variable pressure diffuser system 40 operating at the proper frequency. Notice that there is no diffuser angle $\alpha$ in exhaust channels 30 and 32.

Figure 4:
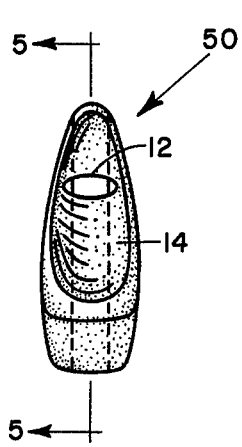
FIG. 4 is a front elevational view of a typical lure body.
Figure 5:
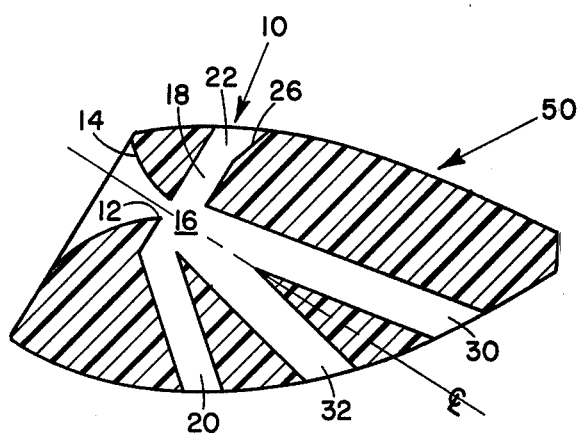
FIG. 5 is a cross sectional view of the lure body shown in FIG. 4 taken along section lines 5—5.
Figure 6:
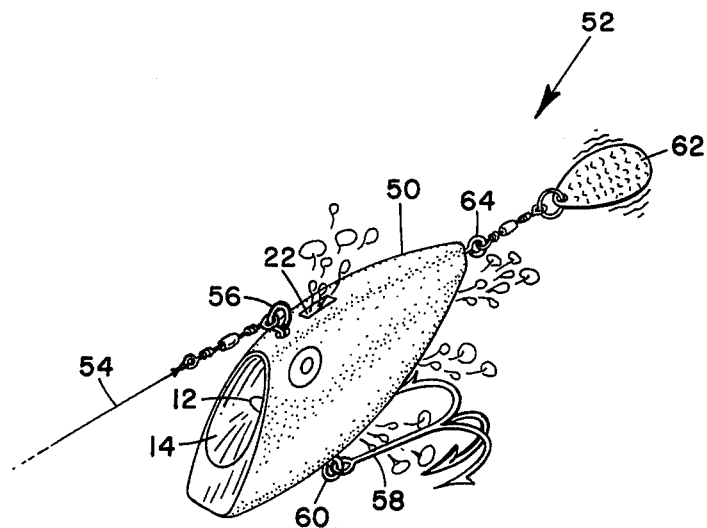
FIG. 6 is a perspective view of the lure body shown in FIGS. 4 and 5 in actual use.

Referring now to a fishing lure embodying a variable pressure diffuser system as previously described in conjunction with FIGS. 1, 2 and 3, reference is made to FIGS. 4, 5 and 6 in combination. Like numbers will be used to designate like parts which are similar to those shown in FIG. 1. The front of the fish lure body 50 has a funnel 14 that terminates into venturi 12 of the variable pressure diffuser system 10. The control channels 18 and 20 control the flow of water from fluidic diffuser chamber 16. The flow of the water through the fluidic diffuser chamber 16 flows alternately through exhaust channel 30 and 32 to create pulsating vibrations that simulate aquatic sounds.

Notice that control channel 18 has an outer end 22 that is flared represented by inner wall 26. However, control channel 20 is angled away from the normal perpendicular configuration shown in FIG. 1. All that is required is that control channel 20 initially be perpendicular to the center line of the lure body 50. Also it is not essential that a control channel be flared as can be seen in FIG. 5 in control channel 20. As the lure body 50 is pulled to the left (see FIG. 5) fluid will flow through venturi 12 with a vacuum being created in control channels 18 and 20. These control channels, and the vacuums created therein, cause the flow of the fluid to alternately exhaust through exhaust channels 30 and 32.

The variable pressure diffuser systems as shown in FIGS. 2 and 3 may also be substituted for the one shown in FIG. 5. Each of these would create a pulsating aquatic sound as the lure is drawn through the water. The variable pressure diffuser systems disclosed in the drawings is known in the art as a bistable fluidic amplifier.

Referring now to FIG. 6 a fishing lure, represented generally by reference numeral 52, is shown in actual use. A fishing line 54 is attached to an eyelet 56 that is embedded in the fish lure body 50. A hook 58 is attached to the lower portion of the fish lure body 50 again by eyelet 60 embedded therein. A flapper 62 is connected to the end of fish lure body 50 by means of eyelet 64 embedded in the fish lure body 50. As the fishing lure 52 is pulled through the water by fishing line 54, water will flow through funnel 14 and venturi 12. The vacuum created in the control channels will cause some water to flow therefrom with the main stream of water being pulsated between the exhaust channels. The outer end 22 of a control channel can be clearly seen in FIG. 6. The frequency of the aquatic vibrations, which resemble live food source for game fish, will cause the game fish to strike the lure 52 thereby becoming attached to the fish hook 58.

We claim:

1. A fishing lure having a self-resonating variable pressure diffuser system for generating aquatic sounds to imitate the sound of live bait as the lure is drawn through the water comprising:
a lure body shaped to simulate live bait, said body having means for attaching a fishing line thereto and means for attaching a fish hook thereto; said diffuser system comprising a bistable fluidic amplifier incorporated in said lure body, said bistable fluidic amplifier having passages extending through said lure body whereupon normal retrieval of said fishing lure causes water to flow through said passages of said amplifier, said amplifier being tuned to resonate at a frequency of between 10 to 30 cycles per second to generate aquatic compression waves which imitate the sound of live bait as the lure is pulled through the water.

2. The apparatus of claim 1 wherein said passages include an inlet opening through the front of said lure body, the inlet opening communicating with a diffuser chamber through a venturi, control channels extending from the outer surface of said lure body into the diffuser chamber, exhaust channels extending from said diffuser chamber for discharging water from said diffuser chamber, said exhaust channels angling off the center line of said lure body, a vacuum being created in said control channels by the water flow across the control channels at the outside of said lure body thereby causing an alternating flow of water from said venturi from alternate ones of said exhaust channels.

3. The apparatus of claim 2 wherein said control channels are initially perpendicular to the center line of said lure body.

4. The apparatus of claim 3 wherein said angle of said exhaust channels from the center line of said lure body is approximately 12°.

5. The apparatus of claim 4 wherein frequency of said alternate flow may be varied by varying the diffusion angle from said exhaust control means from 0° to 6°.

6. The apparatus as recited in claim 5 wherein said control channels are enlarged on the outer ends thereof to create an additional vacuum therein.

7. The apparatus of claim 6 wherein the distance between the venturi and the entrance of said exhaust channels is a predetermined multiple of a diameter of said venturi which causes said alternate flow of a predetermined frequency.

8. The apparatus of claim 2 wherein a valve box is located between said exhaust channels downstream of said diffusion chamber for communication with said diffusion chamber.

9. The apparatus of claim 8 including stabilization vents extending from the outer surface of said lure body into said exhaust channels, said stabilization vents being located downstream from said control channels and being substantially parallel thereto.

* * * * *